Patented Oct. 19, 1943

2,332,424

UNITED STATES PATENT OFFICE 2,332,424

PROCESS OF ENAMELING

Carl H. Zwermann, Jr., Robinson, Ill.

No Drawing. Application September 30, 1939,
Serial No. 297,417

3 Claims. (Cl. 106—48)

This invention relates to improvements in process of enameling.

This invention relates to enameling and particularly to the use of titanium dioxide as an opacifier in enameling.

Heretofore titanium dioxide has been recognized as a possible opacifier in enameling because of its high index of refraction and because of its relatively low price. It has been found, however, that titanium dioxide is not completely satisfactory as an opacifier for white enamel because during the firing of the enamel the titanium dioxide becomes discolored by changing from the anatase form to the rutile form.

I have found that titanium dioxide may be used as an opacifier if it is employed with a frit of extreme fineness, considerably below that of ordinary frits.

The objects of this invention are:

First, to produce a new and improved enamel.

Second, to produce such an enamel in which titanium dioxide in the anatase form may be employed and in which the titanium dioxide will retain the anatase form after firing.

Third, to produce such an enamel which will be free from tear during firing or drying and which will have a high degree of opacity.

Fourth, to provide a new and improved method of making titanium dioxide opacified enamels which will not discolor upon firing and which will have the above mentioned desirable properties.

Fifth, to produce a new and improved enameled article.

Other objects and advantages pertaining to details and economies will appear from the description to follow.

In carrying out my invention, I make use of any standard frit. I grind the frit to a greater extent than has been heretofore customary. In the past, the finest frit has been ground to such an extent that only 1% by weight of the frit is retained on a #325 sieve, having openings of 44 microns. I carry on the grinding in the ball mill for a length of time considerably greater than that employed to obtain the above frit and thereby produce a frit in which the particles are predominantly of a size less than 4 microns.

With this frit, I mix the titanium dioxide in the anatase form. This is a very finely divided opacifier being of a size of a few tenths of a micron. The mixing is carried on in a ball mill until the opacifier and frit are intimately mixed. I prefer to use 100 parts by weight of frit to from 10 to 25 parts by weight of titanium dioxide in the anatase form.

After intimately mixing the frit and the titanium dioxide in finely divided form, I subject the mixture to a temperature capable of softening the frit so that the surface tension of the particles thereof will shrink the particles to reduce their overall dimension, which is an important factor in the elimination of tear in the final enamel during firing or drying. The temperature employed must be such, and the length of time of the application thereof must be such that the titanium dioxide in the mixture will not be converted from the anatase form to the rutile form or some other form which discolors the enamel. I have found that the application of a temperature of 1280° F. to the mixture for one hour will have the desired shrinking effect upon the frit particles without effecting the change of the titanium dioxide in the anatase form in the mixture. The temperature may vary somewhat with the composition of the material.

After the above described sintering operation, the frit and opacifier are mixed with any suitable floating agent and water and are applied to the article to be enameled. After drying, the article may be fired in any suitable furnace. I have found that the application of 1500° F. for three minutes for the enamel used will produce a satisfactory article and that a re-firing at the same temperature and the same length of time may be employed without causing discoloration by changing the titanium dioxide from the anatase to the rutile or other discolored form.

The finished product has a very satisfactory opacity even with a very light coat of the enamel. An article having a coat of 10 grams to the square foot gives a reflectance of approximately 75%. A coat of 17½ grams per square foot gives a reflectance of 82.5%. There is not the discoloration ordinarily attendant upon the use of titanium dioxide.

Having thus described my invention, what I claim as new and desire to secure by Letters Patent is:

1. The method of producing titanium dioxide enamel comprising intimately mixing finely divided titanium dioxide in the anatase form with vitrified frit comprising predominantly particles of a size of four microns or less, and heating mixture at a temperature of approximately 1280° F. for approximately one hour.

2. The method of producing titanium dioxide enamel comprising intimately mixing finely divided titanium dioxide in the anatase form with vitrified frit comprising predominantly particles of a size of four microns or less, and heating said mixture at a temperature and for a length of time below that required to convert the titanium dioxide in said mixture from the anatase form but sufficiently high to soften said frit, whereby surface tension will reduce the overall dimensions of the particles.

3. The method of producing titanium dioxide enamel comprising intimately mixing finely divided titanium dioxide in the anatase form with vitrified frit comprising predominantly particles of a size of four microns or less, and heating said mixture to soften the frit whereby surface tension reduces the overall dimensions of the particles, and controlling the temperature and the time of heating to prevent conversion of the titanium dioxide in said mixture from the anatase form.

CARL H. ZWERMANN, Jr.